(12) United States Patent
Mohammadi et al.

(10) Patent No.: US 7,217,339 B2
(45) Date of Patent: *May 15, 2007

(54) FIBROUS STRUCTURES EXHIBITING IMPROVED WET STRENGTH PROPERTIES

(75) Inventors: Khosrow Parviz Mohammadi, West Chester, OH (US); Robert Lee Barcus, Cincinnati, OH (US); Angela Marie Leimbach, Hamilton, OH (US); Stephen Robert Kelly, Owenton, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 75 days.

This patent is subject to a terminal disclaimer.

(21) Appl. No.: 10/958,029

(22) Filed: Oct. 4, 2004

(65) Prior Publication Data

US 2005/0082026 A1 Apr. 21, 2005

Related U.S. Application Data

(63) Continuation-in-part of application No. 10/687,381, filed on Oct. 16, 2003, now Pat. No. 7,125,469.

(51) Int. Cl.
*D21H 21/20* (2006.01)
*D21H 17/33* (2006.01)
*D21H 17/44* (2006.01)
*A61F 13/00* (2006.01)

(52) U.S. Cl. .............. 162/158; 162/164.1; 162/168.1; 604/358; 526/304; 526/307.5; 526/315

(58) Field of Classification Search ........... 162/158, 162/164.1, 168.1; 604/358; 526/304, 307.5, 526/315
See application file for complete search history.

(56) References Cited

U.S. PATENT DOCUMENTS 3,317,370 A * 5/1967 Kekish .................. 162/168.4
3,347,832 A * 10/1967 Mills ........................ 526/263
4,603,176 A 7/1986 Bjorkquist et al.
4,753,710 A * 6/1988 Langley et al. .......... 162/164.3
4,866,151 A * 9/1989 Tsai et al. .................. 527/300
4,913,775 A * 4/1990 Langley et al. .......... 162/164.3
4,981,557 A 1/1991 Bjorkquist et al.
5,008,344 A 4/1991 Bjorkquist
5,085,736 A 2/1992 Bjorkquist
5,138,002 A 8/1992 Bjorkquist
5,401,810 A * 3/1995 Jansma et al. .............. 525/385
5,490,904 A * 2/1996 Jansma et al. ........... 162/168.2
5,656,746 A * 8/1997 Smith et al. .................. 536/63
5,830,320 A 11/1998 Park et al.
5,955,567 A 9/1999 Bigorra Llosas et al.
6,130,303 A 10/2000 Neff et al.
6,149,769 A * 11/2000 Mohammadi et al. ....... 162/111
6,197,979 B1 * 3/2001 Crisp et al. ................. 528/230
6,281,291 B1 8/2001 Bazaj et al.
6,322,665 B1 11/2001 Sun et al.
6,494,990 B2 12/2002 Bazaj et al.
2002/0104633 A1 8/2002 Sun et al.
2003/0022568 A1 1/2003 Branham et al.
2003/0026963 A1 2/2003 Chang et al.
2003/0032352 A1 2/2003 Chang et al.

FOREIGN PATENT DOCUMENTS

| GB | 2 324 615 | 10/1998 |
|---|---|---|
| WO | WO 00/11046 | 2/2000 |
| WO | WO 01/36491 A1 | 5/2001 |
| WO | WO 01/38638 A1 | 5/2001 |
| WO | WO 02/101144 A1 | 12/2002 |

* cited by examiner

*Primary Examiner*—Eric Hug
*Assistant Examiner*—Dennis Cordray
(74) *Attorney, Agent, or Firm*—C. Brant Cook; Betty J. Zea; David M. Weirich

(57) ABSTRACT

Fibrous structures and/or sanitary tissue products comprising such fibrous structures, more particularly to fibrous structures and/or sanitary tissue products that exhibit improved wet strength properties, especially temporary wet strength properties, as compared to fibrous structures and/or sanitary tissue products that contain conventional wet strength additives.

13 Claims, 3 Drawing Sheets

Fig. 1

% Decay Chart

| Polymer | #/ton | 5s WT | 1min | Decay | 5min | Decay | 30min | Decay |
|---|---|---|---|---|---|---|---|---|
| Prior Art | 2 | 64.0 | 58.0 | 9% | 43.0 | 33% | 23.0 | 64% |
| Embodiment 1 | 2 | 41.3 | 23.4 | 43% | 10.3 | 75% | 6.7 | 84% |
| Embodiment 2 | 2 | 41.2 | 22.7 | 44% | 10.9 | 73% | 8.8 | 79% |
| Embodiment 3 | 2 | 83.4 | 59.3 | 27% | 26.6 | 67% | 11.9 | 85% |
| Embodiment 4 | 2 | 113.5 | 78.3 | 30% | 52.6 | 54% | 26.3 | 77% |
| Embodiment 5 | 2 | 65.1 | 41.3 | 36% | 15.3 | 76% | 10.9 | 83% |
| Embodiment 6 | 4 | 80.9 | 52.6 | 35% | 19.8 | 75% | 9.1 | 89% |
| Embodiment 7 | 2 | 102.7 | 80.9 | 21% | 44.2 | 57% | 25.0 | 76% |
| Embodiment 8 | 4 | 136.7 | 111.1 | 18% | 75.3 | 45% | 27.6 | 80% |
| Embodiment 9 | 5 | 115.0 | 64.2 | 44% | 27.9 | 76% | 17.3 | 85% |
| Embodiment 10 | 5 | 123.5 | 105.2 | 14% | 42.1 | 66% | 20.0 | 84% |
| Embodiment 11 | 5 | 113.6 | 70.8 | 38% | 32.1 | 72% | 8.9 | 92% |
| Embodiment 12 | 5 | 144.1 | 96.6 | 33% | 46.9 | 68% | 21.2 | 85% |
| Embodiment 13 | 5 | 136.7 | 99.3 | 27% | 30.0 | 78% | 14.5 | 89% |
| Embodiment 14 | 5 | 131.6 | 84.6 | 36% | 33.9 | 74% | 16.8 | 87% |

Fig. 3

Reduction in % Clogging Chart

| | Prior Art Tw = 83 g/in | Embodiment 1 Tw = 90 g/in | Embodiment 1 Tw = 90 g/in |
|---|---|---|---|
| Loading | % Clog | % Clog | Reduction in % Clogging |
| 6 X 7 | 30 | 10 | 3 times |

Fig. 4

Softness Chart

| Fibrous Structure/ Sanitary Tissue Product | Lint and Dry Tensile Corrected Softness vs. Prior Art Fibrous Structure/Sanitary Tissue Product |
|---|---|
| | PSU |
| Prior Art | 0 |
| Embodiment 1 | +0.48 |
| Embodiment 2 | +0.86 |
| Embodiment 3 | +0.58 |
| Embodiment 4 | +0.5 |

US 7,217,339 B2

FIBROUS STRUCTURES EXHIBITING IMPROVED WET STRENGTH PROPERTIES

CROSS REFERENCE TO RELATED APPLICATIONS

This application is a continuation-in-part application of U.S. application Ser. No. 10/687,381 filed Oct. 16, 2003 now U.S. Pat. No. 7,125,469.

FIELD OF THE INVENTION

The present invention relates to fibrous structures and/or sanitary tissue products comprising such fibrous structures, more particularly to fibrous structures and/or sanitary tissue products that exhibit improved wet strength properties, especially temporary wet strength properties, as compared to fibrous structures and/or sanitary tissue products that contain conventional wet strength additives.

BACKGROUND OF THE INVENTION

Wet strength properties are critical in certain fibrous structures, especially sanitary tissue products, particularly toilet tissue. Fibrous structures utilize wet strength additives to impart wet strength. One example of a commercially available wet strength additive is PAREZ® from Bayer Chemicals.

Fibrous structures, such as sanitary tissue products, particularly toilet tissues that contain wet strength additives, especially temporary wet strength additives, exhibit wet strength properties such as Initial Total Wet Tensile, % Decay, Decay Rate and/or % Clogging Reduction. These wet strength properties influence the ease at which such fibrous structures can be flushed in conventional toilets for example.

Prior art fibrous structures and/or sanitary tissue products comprising conventional wet strength additives exhibit a % Decay at 5 minutes of around 33% and/or a % Decay at 30 minutes of around 64%.

There continues to be a need for fibrous structures that comprise wet strength additives, especially temporary wet strength additives that exhibit improved wet strength properties, especially temporary wet strength properties, over existing fibrous structures that contain conventional wet strength additives in order to better meet the needs of consumers of fibrous structures.

Accordingly, there is a need to develop fibrous structures comprising wet strength additives, especially temporary wet strength additives that exhibit improved wet strength properties as compared to fibrous structures comprising conventional wet strength additives.

SUMMARY OF THE INVENTION

The present invention fulfills the needs identified above by providing fibrous structures, especially wet strength additive-containing fibrous structures that exhibit improved wet strength properties, especially temporary wet strength properties, as compared to fibrous structures that contain conventional wet strength additives.

In one aspect of the present invention, a fibrous structure comprising a wet strength additive, wherein the fibrous structure exhibits a % Decay at 5 minutes of greater than 45% and/or greater than 50% and/or at least about 55% and/or at least about 60% and/or at least about 75% (as illustrated, for example, in FIG. 1) as determined by the % Decay Test Method described herein, is provided.

In another aspect of the present invention, a fibrous structure comprising a wet strength additive, wherein the fibrous structure exhibits a % Decay at 30 minutes of greater than 65% and/or greater than 70% and/or at least about 75% and/or at least about 80% and/or at least about 85% and/or at least about 90% (as illustrated, for example, in FIG. 1) as determined by the % Decay Test Method described herein, is provided.

In yet another aspect of the present invention, a fibrous structure comprising a wet strength additive, wherein the fibrous structure exhibits a Decay Rate slope (as illustrated, for example, by the slope of the lines in FIG. 2) of greater than about 13 and/or greater than about 14 and/or greater than about 15 and/or greater than about 16 and/or greater than about 17 and/or greater than about 18, as determined according to the Decay Rate Calculation described herein, is provided.

In still yet another aspect of the present invention, a fibrous structure comprising a wet strength additive, wherein the fibrous structure exhibits a Reduction in % Clogging of at least about 1.5 times and/or at least about 2.0 times and/or at least about 2.5 times and/or at least about 3.0 times (as illustrated, for example, in FIG. 3) as determined by the Reduction in % Clogging Test Method described herein, is provided.

In yet another aspect of the present invention, a fibrous structure and/or sanitary tissue product in accordance with the present invention wherein the fibrous structure and/or sanitary tissue product exhibits a softness improvement of greater than +0.20 PSU and/or greater than +0.30 PSU and/or greater than +0.40 PSU and/or greater than +0.50 PSU (as illustrated, for example, in FIG. 4) as determined by the Softness Test Method described herein, is provided.

Accordingly, the present invention provides a fibrous structure, especially a wet strength additive-containing fibrous structure that exhibits improved wet strength properties as compared to fibrous structures comprising a conventional wet strength additive.

BRIEF DESCRIPTION OF THE DRAWINGS

FIG. 1 is a % Decay Chart showing a prior art fibrous structure/sanitary tissue product and embodiments of fibrous structures/sanitary tissue products in accordance with the present invention;

FIG. 3 is a Reduction in % Clogging Chart showing a prior art fibrous structure/sanitary tissue product and embodiments of fibrous structures/sanitary tissue products in accordance with the present invention; and FIG. 4 is a Softness Chart showing a prior art fibrous structure/sanitary tissue product and embodiments of fibrous structures/sanitary tissue products in accordance with the present invention.

Figure 2:
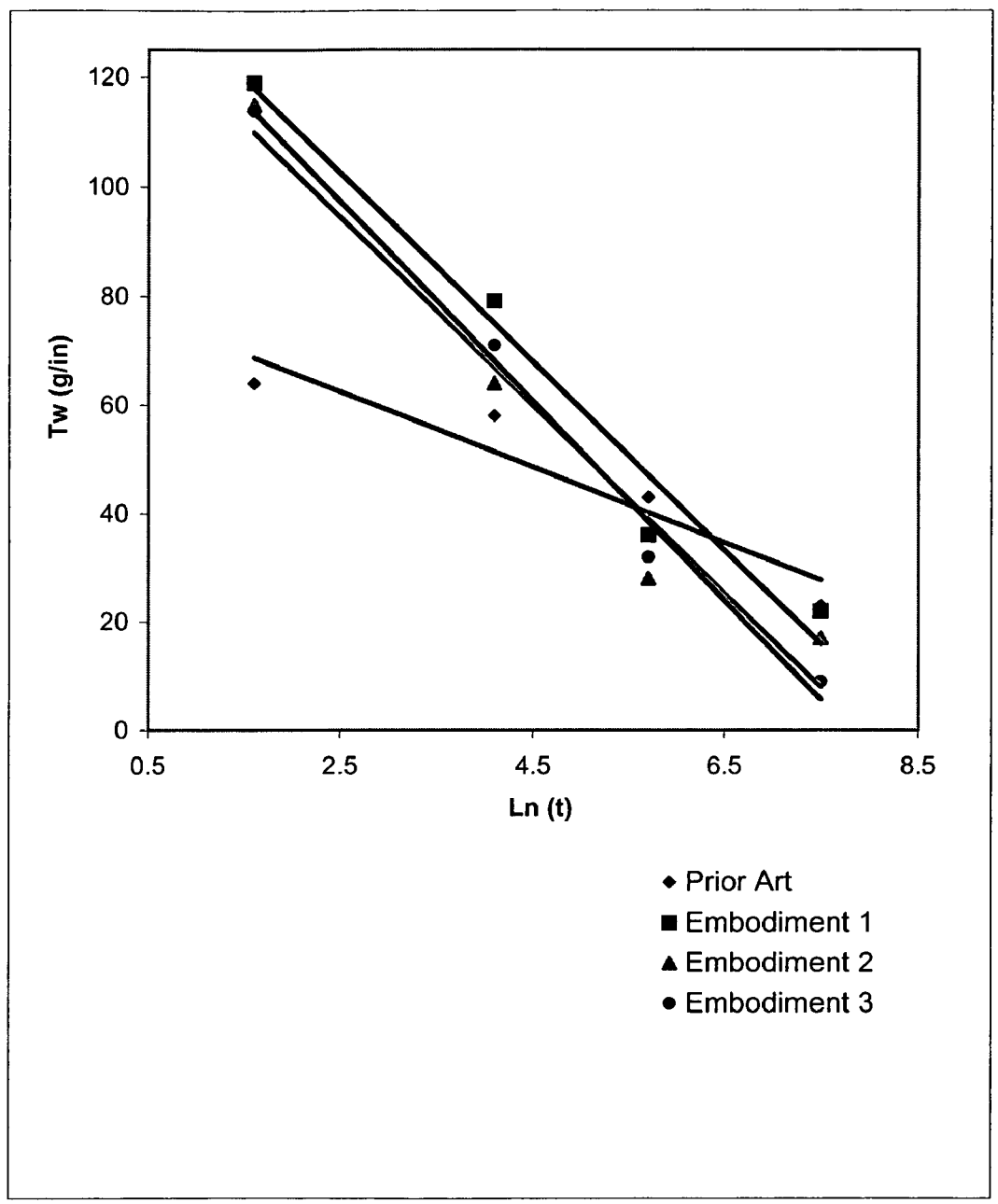
FIG. 2 is a Decay Rate Slope Graph showing a prior art fibrous structure/sanitary tissue product and embodiments of fibrous structures/sanitary tissue products in accordance with the present invention.

The prior art fibrous structure/sanitary tissue product comprises the best, or one of the best, conventional wet strength additives commercially available and/or known at the time of filing of this application.

Various embodiments of the fibrous structures and/or sanitary tissue products of the present invention are included in the Figures. The embodiments of the present invention in one Figure do not necessarily correspond to embodiments in any of the other Figures.

DETAILED DESCRIPTION OF THE INVENTION

Definitions

"Fibrous structure" as used herein means a substrate formed from non-woven fibers. The fibrous structure of the present invention may be made by any suitable process, such as wet-laid, air-laid, spunbond processes. The fibrous structure may be in the form of one or more plies suitable for incorporation into a sanitary tissue product and/or may be in the form of non-woven garments, such as surgical garments including surgical shoe covers, and/or non-woven paper products such as surgical towels and wipes.

"Fibrous structure comprising (containing) a wet strength additive" as used herein means that the fibrous structure comprises an agent that increases the wet strength of the fibrous structure as compared to the fibrous structure without the agent. In one embodiment, the agent increase the initial total wet tensile of the fibrous structure.

"Fiber" as used herein means an elongate particulate having an apparent length greatly exceeding its apparent width, i.e. a length to diameter ratio of at least about 10. More specifically, as used herein, "fiber" refers to papermaking fibers. The present invention contemplates the use of a variety of papermaking fibers, such as, for example, natural fibers or synthetic fibers, or any other suitable fibers, and any combination thereof. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. No. 4,300,981 and U.S. Pat. No. 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking. In addition to the above, fibers and/or filaments made from polymers, specifically hydroxyl polymers may be used in the present invention. Nonlimiting examples of suitable hydroxyl polymers include polyvinyl alcohol, starch, starch derivatives, chitosan, chitosan derivatives, cellulose derivatives, gums, arabinans, galactans and mixtures thereof.

"Sanitary tissue product" as used herein means a wiping implement for post-urinary and post-bowel movement cleaning (toilet tissue), for otorhinolaryngological discharges (facial tissue), and multi-functional absorbent and cleaning uses (absorbent towels).

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself.

"Basis Weight" as used herein is the weight per unit area of a sample reported in lbs/3000 ft$^2$ or g/m$^2$. Basis weight is measured by preparing one or more samples of a certain area (m$^2$) and weighing the sample(s) of a fibrous structure according to the present invention and/or a paper product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples (m$^2$). The basis weight (g/m$^2$) is calculated by dividing the average weight (g) by the average area of the samples (m$^2$). If needed, the basis weight in g/m$^2$ units can be converted to lbs/3000 ft$^2$.

"Caliper" as used herein means the macroscopic thickness of a sample. Caliper of a sample of fibrous structure according to the present invention is determined by cutting a sample of the fibrous structure such that it is larger in size than a load foot loading surface where the load foot loading surface has a circular surface area of about 3.14 in$^2$. The sample is confined between a horizontal flat surface and the load foot loading surface. The load foot loading surface applies a confining pressure to the sample of 15.5 g/cm$^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in millimeters.

"Density" as used herein means the basis weight of a sample divided by the caliper with appropriate conversions incorporated therein. Apparent density used herein has the units g/cm$^3$. "Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107–121. Unless otherwise specified, all molecular weight values herein refer to the weight average molecular weight.

"Machine Direction" or "MD" as used herein means the direction parallel to the flow of the fibrous structure through the papermaking machine and/or product manufacturing equipment.

"Cross Machine Direction" or "CD" as used herein means the direction perpendicular to the machine direction in the same plane of the fibrous structure and/or paper product comprising the fibrous structure.

"% Decay" as used herein means the percent loss of wet tensile as measured according to the % Decay Test Method described herein. As the % decay increases, the ability of the fibrous structure and/or sanitary tissue product comprising the fibrous structure to flush without clogging sewage systems and/or septic tanks increases. % Decay is typically measured at set time points after the fibrous structure and/or sanitary tissue product sample or portion thereof has been immersed in water. The set time points are 5 minutes and 30 minutes.

The % Decay as used herein does not take into account any wet strength the neat fibrous structure and/or sanitary tissue product (without any wet strength additive) may inherently possess.

"Decay Rate" as used herein means the rate at which the loss of wet tensile occurs in a fibrous structure and/or sanitary tissue product as measured according to the Decay Rate Calculation described herein. The Decay Rate is the slope of a plot of Wet Tensile (g/2.54 cm or g/in) versus In Time (seconds) for a fibrous structure and/or sanitary tissue product sample. The wet tensile of the fibrous structure and/or sanitary tissue product is determined at 5 seconds (Initial Total Wet Tensile), 60 seconds (Wet Tensile at 1 minute), 300 seconds (Wet Tensile at 5 minutes) and 1800 seconds (Wet Tensile at 30 minutes).

The plot of Wet Tensile versus In Time for the fibrous structures and/or sanitary tissue products of the present invention shows a drastically higher decay rate slope than a prior art fibrous structure/sanitary tissue product that comprises a conventional wet strength additive, such as Parez® temporary wet strength additive, which is commercially available from Bayer Chemicals. The decay rate slope of fibrous structures/sanitary tissue products that comprise a Parez® temporary wet strength additive was from about 6 to about 12.75, whereas in embodiments of fibrous structures and/or sanitary tissue products of the present invention, the slope was greater than 13 as illustrated in the Decay Rate Slope Graph of FIG. 2. The actual calculated slope since it is a reduction of wet tensile is negative, but for purposes of the present invention, the negative sign is dropped and the positive number is expressed as the decay rate slope.

"% Clogging" as used herein means the percent of times a defined amount of fibrous structure and/or sanitary tissue product, especially a fibrous structure and/or sanitary tissue product comprising a wet strength additive, fails to pass through a household toilet (specifically a Kohler Portrait Lite toilet with a 6 L (1.6 gallon) per flush volume) and drainage pipe system. % Clogging is measured according to the % Clogging Test Method described herein.

"Reduction in % Clogging" as used herein means the reduction (i.e., 1.5 times, 2 times, 2.5 times and/or 3 times, etc.) in % clogging a fibrous structure and/or sanitary tissue product in accordance with the present invention exhibits as compared to a fibrous structure/sanitary tissue product comprising a conventional wet strength additive (i.e., a commercially available and/or known wet strength additive at the time of filing this application).

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107–121. Unless otherwise specified, all molecular weight values herein refer to the weight average molecular weight.

Fibrous Structure

The fibrous structures of the present invention may be incorporated into a single-ply or multi-ply sanitary tissue product.

The fibrous structures may be foreshortened, such as via creping and/or microcontraction and/or rush transferring, or non-forshortened, such as not creping; creped from a cylindrical dryer with a creping doctor blade, removed from a cylindrical dryer without the use of a creping doctor blade, or made without a cylindrical dryer.

The fibrous structures of the present invention are useful in paper, especially sanitary tissue paper products including, but not limited to: conventionally felt-pressed tissue paper; pattern densified tissue paper; and high-bulk, uncompacted tissue paper. The tissue paper may be of a homogenous or multilayered construction; and tissue paper products made therefrom may be of a single-ply or multi-ply construction.

In one embodiment, the fibrous structure and/or sanitary tissue product of the present invention may exhibit a basis weight of between about 10 $g/m^2$ and about 120 $g/m^2$, and a density of about 0.60 g/cc or less.

In another embodiment, the fibrous structure and/or sanitary tissue product of the present invention may exhibit a basis weight below about 35 $g/m^2$; and a density about 0.30 $g/cm^3$ or less.

In another embodiment, the fibrous structure and/or sanitary tissue product of the present invention may exhibit a density between about 0.04 $g/cm^3$ and about 0.20 $g/cm^3$.

The fibrous structures may be selected from the group consisting of: through-air-dried fibrous structures, differential density fibrous structures, wet laid fibrous structures, air laid fibrous structures, conventional fibrous structures, meltblown fibrous structures, spunbond fibrous structures, rotary spun fibrous structures and mixtures thereof.

The fibrous structures may be made with a fibrous furnish that produces a single layer embryonic fibrous web or a fibrous furnish that produces a multi-layer embryonic fibrous web.

The fibrous structures of the present invention and/or sanitary tissue products comprising such fibrous structures may have a total dry tensile of greater than about 150 g/2.54 cm (150 g/in) and/or from about 200 g/2.54 cm (200 g/in) to about 1000 g/2.54 cm (1000 g/in) and/or from about 250 g/2.54 cm (250 g/in) to about 850 g/2.54 cm (850 g/in) as measured by the Total Dry Tensile Test Method described herein.

The fibrous structures of the present invention and/or sanitary tissue products comprising such fibrous structures may have an initial total wet tensile of at least about 25 g/2.54 cm (25 g/in) and/or at least about 40 g/2.54 cm (40 g/in) and/or at least about 60 g/2.54 cm (60 g/in) and/or at least about 80 g/2.54 cm (80 g/in) and/or at least about 100 g/2.54 cm (100 g/in). It is desirable that the fibrous structures and/or sanitary tissue products comprising such fibrous structures have an initial total wet tensile of less than about 600 g/2.54 cm (600 g/in) and/or less than about 500 g/2.54 cm (500 g/in) and/or less than about 400 g/2.54 cm (400 g/in). The initial total wet tensile of the fibrous structures and/or sanitary tissue products comprising such fibrous structures is measured by the Initial Total Wet Tensile Test Method described herein. Initial total wet tensile can be inherently present in the fibrous structure as a result of the materials making up the fibrous structure and/or the process used to make the fibrous structure and/or can be provided by the presence of a wet strength additive in the fibrous structure. Wet strength additives are known in the art.

Fibrous Structure Additives

Any fibrous structure/sanitary tissue product additives, including wet strength additives, known to those skilled in the art may be incorporated into the fibrous structures and/or sanitary tissue products of the present invention so long as the fibrous structures/sanitary tissue products exhibit improved wet strength properties, as described herein, as compared to fibrous structures/sanitary tissue products comprising a conventional wet strength additive.

A nonlimiting example of a suitable wet strength additive for use in the fibrous structures and/or sanitary tissue products of the present invention includes temporary wet strength additives described herein.

Temporary Wet Strength Additives

Nonlimiting examples of suitable temporary wet strength additives for use in the fibrous structures of the present invention generally have weight average molecular weights of from about 20,000 to about 400,000 and/or from about 50,000 to about 400,000 and/or from about 70,000 to about 400,000 and/or from about 70,000 to about 300,000 and/or from about 100,000 to about 200,000.

In forming fibrous structures and/or sanitary tissue products of the present invention, wet strength additives, if present, can be added as dilute aqueous solutions at any point in the papermaking process where wet strength additives are customarily added. Such nonfibrous additions are described in Young, "Fiber Preparation and Approach Flow" Pulp and Paper Chemistry and Chemical Technology, Vol. 2, pp 881–882, which is incorporated by reference.

In one embodiment, the fibrous structures of the present invention comprise from about 0.005% to about 5% and/or from about 0.1% to about 2% and/or from about 0.1% to about 1% by weight of the fiber.

The temporary wet strength additives of the present invention impart wet tensile strength properties and wet tensile decay properties to the fibrous structures and/or sanitary tissue products of the present invention.

It has been found that temporary wet strength additives with high weight average molecular weights (i.e. those in excess of 300,000) may decay unacceptably slow for consumer purposes. They may not achieve a wet tensile decay rate of better than 35–45% after 5 minutes and/or better than 50–65% after 30 minutes.

Further, it has been found that temporary wet strength additives with extremely low weight average molecular weights (i.e. those less than 70,000) may have very low wet strength and are may not be optimal as temporary wet strength additives for fibrous structures and/or sanitary tissue products.

The temporary wet strength additives in accordance with the present invention have the formula:

Structure I

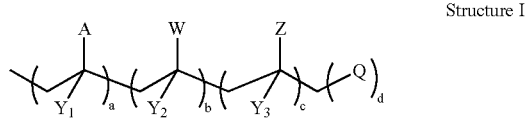

wherein: A (the moiety present on the co-crosslinking monomeric unit) is independently an electrophilic moiety, nonlimiting examples of which include the following:

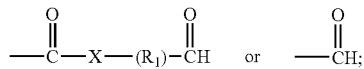

Z (the moiety present on the homo-crosslinking monomeric unit) is independently a nucleophilic moiety capable of forming an unstable covalent bond with the electrophilic moiety, nonlimiting examples of which include the following:

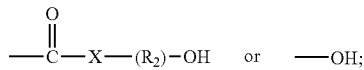

and X is independently —O—, —NH—, or —NCH$_3$—; and R$_1$ and R$_2$ are independently substituted or unsubstituted aliphatic groups; Y$_1$, Y$_2$, and Y$_3$ are independently —H, —H$_3$, or a halogen; Q is a cationic moiety; and W is a non-nucleophilic moiety or a nucleophilic moiety that does not form a stable covalent bond with the electrophilic moiety. Nonlimiting examples of moieties for W include water-soluble nitrogen heterocyclic moieties and/or water-soluble carboxylic acid moieties.

The mole percent of a ranges from about 1% to about 47%, preferably from about 5% to about 30%, the mole percent of b ranges from about 0% to about 60%, preferably from about 0% to about 45%, the mole percent of c ranges from about 10% to about 90%, preferably from about 30% to about 80%, and d ranges from about 1% to about 40%, preferably from about 2% to about 20%, more preferably from about 5% to about 12%.

Unless otherwise expressly specified, values for a, b, c, and d shall be mole percentage values based upon the average number of monomeric units in the polymer backbone of the temporary wet strength additive of the present invention.

The monomeric units of the polymer backbone of the temporary wet strength additive of the present invention are randomly distributed throughout the polymer in ratios corresponding to the mole percentage ranges described herein.

Each class of monomeric units may include a single monomer or may include combinations of two or more different monomers within that class. The mole percent of each monomeric unit within a class of monomeric units may be independently selected.

a. Co-Crosslinking Monomeric Unit

The co-crosslinking monomeric unit of the temporary wet strength additives of the present invention comprises an electrophilic moiety and can be derived from a monomer having the following structure:

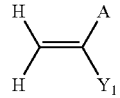

wherein Y$_1$ and A are as defined above. If A is:

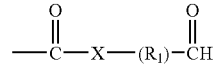

R$_1$ can be a substituted or unsubstituted, branched or linear aliphatic group. The aliphatic group preferably comprises a methylene or a C$_2$–C$_{18}$ chain, more preferably a methylene or a C$_2$–C$_7$ chain, even more preferably a methylene or a C$_2$ chain. Preferably, if R$_1$ is substituted, the substituent(s) will include an electron withdrawing functionality at the alpha-methylene position relative to the aldehyde moiety. Suitable electron withdrawing groups include, but are not limited to, halogens, such as chlorine, fluorine, and bromine; amides, such as —NHCOR' wherein each R' can independently be substituted or unsubstituted, branched or linear C$_1$–C$_{12}$ aliphatic groups; hydroxyl groups; alkoxy groups, preferably with C$_1$–C$_8$ alkyl chains; cyano groups, e.g., —CN; and nitro groups, e.g. —NO$_2$. The aldehyde functionality can optionally be chemically protected during polymerization by techniques well known in the art.

Nonlimiting examples of suitable co-crosslinking monomeric units include N-(2,2-dimethoxyethyl)-N-methyl acrylamide, acrolein, methacrolein, glyoxylated acrylamide, 3,3-dimethyoxypropyl acrylamide, 3,3 diethoxypropyl acrylamide, 3,3-dimethoxypropyl methacrylamide, 2,2 dimethoxy-1-methylethyl acrylate,3,3-dimethoxypropyl methacrylate, 2-(acryloylamino)ethanal dimethylacetal, 2-(methacryloylamino propanal dimethyl acetal, 5-(acryloylamino)pentanal dimethylacetal, 8-(acryloylamino)octanal dimethylacetal, and 3-(N-acryloyl-N-methylamino)propanal dimethyl acetal. N-(2,2-dimethoxyethyl)-N-methyl acrylamide is most preferred. Other suitable monomers are disclosed in U.S. Pat. No. 3,410,828, Kekish issued Nov. 12, 1986 and U.S. Pat. No. 3,317,370, Kekish, issued May 2, 1967, both of which patents are incorporated herein by reference.

b. Homo-Crosslinking Monomeric Units

The homo-crosslinking monomeric unit of the temporary wet strength additives of the present invention comprises a nucleophilic moiety capable of forming an unstable, covalent bond with an electrophilic moiety (i.e. aldehyde moiety present on a co-crosslinking monomeric unit). As a result of this unstable covalent bond, the nucleophilic moiety can crosslink together two or more temporary wet strength additives, at least one of which is a temporary wet strength additive of the present invention, via the unstable covalent bond formed between the nucleophilic moiety present on one temporary wet strength additive and the electrophilic moiety present on another temporary wet strength additive. So in other words, a mixture comprising only temporary wet strength additives of the present invention may be crosslinked together via the nucleophilic moiety, as described above, or a mixture of temporary wet strength additives of the present invention with other conventional temporary wet strength additives my be crosslinked together via the nucleophilic moiety present on the temporary wet strength additives of the present invention.

A nonlimiting example of a suitable nucleophilic moiety is a hydroxyl-containing moiety.

The homo-crosslinking monomeric unit of the temporary wet strength additives of the present invention, i.e. monomer units having Z attached thereto in Formula I, can be derived from a monomer having the following structure:

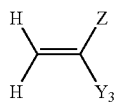

wherein $Y_3$ and Z are as defined above. If Z is:

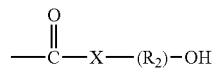

$R_2$ can be a substituted or unsubstituted, branched or linear aliphatic group. The aliphatic group preferably comprises a $C_2-C_{18}$ chain, more preferably a $C_2-C_7$ chain, even more preferably a $C_2-C_4$ chain. If Z is —OH, the hydroxyl group in the homo-crosslinking monomer unit should be chemically protected during polymerization by techniques well known in the art.

Nonlimiting examples of suitable homo-crosslinking monomeric units include the following: 2-hydroxyethyl acrylate, 2-hydroxyethyl methacrylate, 4-hydroxybutyl acrylate, glyceryl mono-methacrylate, glyceryl mono-acrylate, 2-hydroxypropyl acrylate 2-hydroxypropyl methacrylate, hydroxypropyl acrylate 4-hydroxybutyl methacrylate, diethylene glycol mono-methacrylate, sorbitol methacrylate, methyl 2-hydroxymethyl acrylate, 3-methyl butanol-2 methacrylate, 3,3-dimethyl butanol-2 methacrylate, ethyl 2-(hydroxymethyl)acrylate, N-2-hydroxyethyl methacrylamide, N-(2-hydroxypropyl) methacrylamide, 2-acrylamidoglycolic acid, poly(ethylene glycol) acrylate and acrylamidotrishydroxymethylmethane.

Further nonlimiting examples of homo-crosslinking monomer units include poly(ethylene glycol) acrylate having the formula:

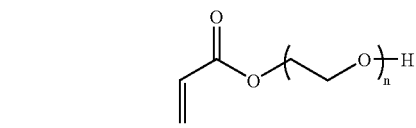

wherein n is an integer from 2 to 100, preferably 2 to 50, more preferably 2 to 30, and a homo-crosslinking monomer unit having the formula:

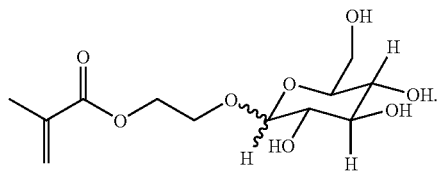

c. Cationic Monomeric Units

The cationic monomeric unit can be derived from any polymerizable monomer which imparts a positive charge to the temporary wet strength additive of the present invention subsequent to polymerization. Cationic monomer units may and preferably do carry a positive electrostatic charge when dissolved in water. Suitable counterions can include chloride, fluoride, bromide, iodide, sulphate, methylsulfate, phosphate and the like.

Nonlimiting examples of suitable cationic monomeric units include 3-(methacryloylamino)propyl trimethyl ammonium chloride, 2-vinyl-N-methylpyridinium chloride, diallyldimethyl ammonium chloride, (p-vinylphenyl)trimethyl ammonium chloride, 2-(dimethylamino)ethyl acrylate, 2-dimethylaminoethyl methacrylate, trimethyl(p-vinylbenzyl)ammonium chloride, p-dimethylaminoethylstyrene, dimethylaminopropyl acrylamide, 2-methylacrloyloxyethyltrimethyl ammonium methylsulfate, and 3-acrylamido-3-methylbutyl trimethyl ammonium chloride.

Further nonlimiting examples of the suitable cationic monomeric units of the present invention include:

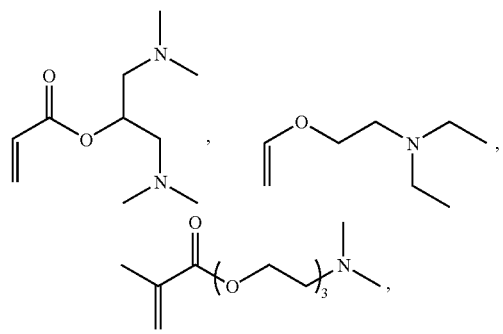

-continued

![methacrylate ester with morpholine]

![methacryloyl piperazine]

d. Non-Nucleophilic and/or Nucleophilic Monomeric Units

The non-nucleophilic and/or nucleophilic monomeric unit (the monomeric unit containing W) that does not form a stable covalent bond with the electrophilic moiety (i.e., aldehyde moiety present on a co-crosslinking monomeric unit) can optionally be incorporated into the temporary wet strength additive of the present invention.

The non-nucleophilic monomeric unit can be derived from a monomer having the following structure:

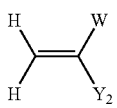

wherein W and $Y_2$ are as defined above, with $Y_2$ preferably being H. Preferably, W is hydrophilic. If W is a hydrophobic moiety, the amount incorporated (b) should be below levels that would result in a copolymer that is insoluble in water.

Nonlimiting examples of suitable non-nucleophilic monomeric units include nitrogen heterocyclic moiety-containing monomeric units, such as vinyl oxazolidones, vinyl imidazoles, vinyl imidazolines, vinyl pyridines, and vinyl pyrrolidones, such as N-vinyl pyrrolidone, 2-vinyl pyrrolidone, etc.

Other specific nitrogen heterocycles useful as monomeric unit starting reagents include N-vinyl-5-methyl-2-oxazolidine, N-vinyl-2-oxazolidone, N-vinyl pyrrolidone, N-vinyl imidazole, N-vinyl-2-methyl imidazole, 2-vinyl imidazole N-vinyl-3-morpholinone, N-vinyl caprolactam, etc. Preferred among these nitrogen heterocycles are the vinyl pyrrolidones.

Other nonlimiting examples of non-nucleophilic, hydrophilic monomeric units are N,N-dimethyl acrylamide and methoxy poly(ethylene glycol) methacrylate.

Nonlimiting examples of non-nucleophilc, hydrophobic monomeric units include alkyl, especially $C_1$–$C_4$, acrylate and methacrylate esters and styrenes.

Nonlimiting examples of suitable non-nucleophilic monomeric units include methyl methacrylate, methyl acrylate, ethyl acrylate, n-propyl acrylate, iso-propylacrylate, n-propyl methacrylate, ethyl methacrylate, iso-propylmethacrylate, n-butyl acrylate, isobutyl acrylate, isobutyl methacrylate, n-butyl methacrylate, a-methyl styrene, benzyl acrylate and ethylhexylacrylate.

In one embodiment, the non-nucleophilic, hydrophobic monomeric unit includes a butyl acrylate.

Nonlimiting examples of nucleophilic monomeric units that do not form stable covalent bonds with the electrophilic moiety include carboxylic acids. Nonlimiting examples of suitable carboxylic acids include $C_{3-8}$ monocarboxylic acids and $C_{4-8}$ dicarboxylic acids may be selected from the group consisting of acrylic acid, methacrylic acid, beta-acryloxypropionic acid, vinyl acetic acid, vinyl propionic acid, crotonic acid, ethacrylic acid, alpha-chloro acrylic acid, alpha-cyano acrylic acid, maleic acid, maleic anhydride, fumaric acid, itaconic acid, citraconic acid, mesaconic acid, methylenemalonic acid, their salts, and mixtures thereof.

More preferably, the $C_{3-8}$ monocarboxylic acids, $C_{4-8}$ dicarboxylic acids, their salts and mixtures thereof, may be selected from the group consisting of acrylic acid, methacrylic acid, maleic acid.

It has been surprisingly found that fibrous structures and/or sanitary tissue products comprising a wet strength additive, especially a temporary wet strength additive, more especially a temporary wet strength additive that comprises a non-nucleophilic monomeric unit, such as butyl acrylate and/or a homo-crosslinking monomeric unit comprising a poly(ethylene glycol) acrylate moiety, for example, minimizes the negative impact of creping on wet tensile of the fibrous structure and/or sanitary tissue product and/or improves the softness of the fibrous structure and/or sanitary tissue product as compared to a fibrous structure and/or sanitary tissue product having a wet strength additive other than those described herein.

Without being bound by theory, it is believed that the wet strength additives of the present invention exhibit a lower Tg than conventional wet strength additives and thus, as a result avoid fracturing during a creping process. By not fracturing during a creping process, loss of wet tensile in a fibrous structure and/or sanitary tissue product comprising such a wet strength additive, especially where the wet strength additive exhibits a Tg of less than about 100° C., is mitigated or inhibited.

The temporary wet strength additives of the present invention can be made by a wide variety of techniques, including bulk, solution, emulsion, or suspension polymerization. Polymerization methods and techniques for polymerization are described generally in Encyclopedia of Polymer Science and Technology, Interscience Publishers (New York), Vol. 7, pp. 361–431 (1967), and Kirk-Othmer Encyclopedia of Chemical Technology, 3rd edition, Vol 18, pp. 740–744, John Wiley & Sons (New York), 1982, both incorporated by reference herein. See also Sorenson, W. P. and Campbell, T. W., Preparative Methods of Polymer Chemistry. 2nd edition, Interscience Publishers (New York), 1968, pp. 248–251, incorporated by reference herein, for general reaction techniques suitable for the present invention. Preferably, the temporary wet strength additives are made by free radical copolymerization, using water soluble initiators. Suitable free radical initiators include, but are not limited to, thermal initiators, redox couples, and photochemical initiators. Redox and photochemical initiators are preferred for polymerization processes initiated at temperatures below about 30° C. (86° F.). Such initiators are described generally in Kirk-Othmer Encyclopedia of Chemical Technology, 3rd edition, John Wiley & Sons (New York), Vol. 13, pp. 355–373 (1981), incorporated by reference herein. Typical water soluble initiators that can provide radicals at 30° C. or below include redox couples, such as potassium persulfate/silver nitrate, and ascorbic acid/hydrogen peroxide. A preferred method utilizes thermal initiators in polymerization processes conducted above 40° C. (104° F.). Water soluble initiators that can provide radicals at 40° C. (104° F.) or higher can be used. These include, but are not limited to, hydrogen peroxide, ammonium persulfate, and 2,2'-azobis(2-amidinopropane) dihydrochloride. In one especially preferred method, water soluble starting monomers are polymerized in an aqueous alcohol solvent at 60°

C. (140° F.) using 2,2'-azobis(2-amidinopropane) dihydrochloride as the initiator. The solvent should typically contain at least about 10% by volume, of alcohol in order to prevent the polymerization reaction medium from gelling. Suitable alcohols for use in such reaction include low molecular weight alcohols such as, but not limited to, methanol, ethanol, isopropanol, and butanol.

Another technique is a solution polymerization as described in U.S. Pat. No. 3,317,370, Kekish, issued May 2, 1967 and U.S. Pat. No. 3,410,828, Kekish, issued Nov. 12, 1968, both incorporated herein by reference. According to such process, the acrolein, or other aldehydic monomer, is copolymerized with a non-nucleophilic, water soluble, nitrogen-heterocyclic polymerizable monomer and a redox initiator system. The copolymer is then made cationic by reacting the copolymer with a water soluble amine or amine quaternary. Amines, including amine quaternaries, that are useful include, but are not limited to, primary, secondary, and tertiary amines such as ethylene diamine, diethylene triamine, triethylene tetramine, tetraethylene pentamine, or partial or fully quaternized derivatives of any of the foregoing, hydrazides and quaternaries thereof such as betaine hydrazide chloride, N-N-dimethylglycine hydrazide, unsymmetrical dimethyl hydrazides, polymers, such as those formed by reaction of urea and polyalkylene polyamines, guanidines, biguanides, guanylureas, mono and polyhydroxy polyamines and quaternaries thereof, etc. When using this emulsion copolymerization technique, it will be necessary to control molecular weight to within the ranges provided herein. Suitable methods for this are discussed below.

Generally, as the weight average molecular weight of the temporary wet strength additive is decreased, initial wet strength will become smaller and wet strength decay will become faster. The temporary wet strength additives of the present invention should have a molecular weight of at least about 20,000, preferably at least about 70,000. The upper limit for molecular weight will be limited by a combination of the ability of the additive to impart the desired level of strength decay, discussed further below, and practical considerations such as sufficiently low viscosity for application to pulp slurries or pulp sheets and technical and economic concerns related to formation of such high molecular weight additives. Generally, the molecular weight should be less than about 400,000, preferably less than about 300,000, and more preferably less than about 200,000.

Molecular weight can be controlled by such methods that are known to those skilled in the art, such as varying reaction temperature (increased temperature typically results in reduced molecular weight), varying free radical initiator concentration, and utilization of chain transfer agents. Suitable chain transfer agents include, but are not limited to, beta.-mercaptoethanol, thioglycolic acid, glycerol, acetone, and isopropanol. Other suitable chain transfer agents include, but are not limited to, those described in Polymer Handbook, 2nd edition, J. Brandrup and E. H. Immergut, editors, Wiley-Intersciences (New York), (1975), pp. II-57 through II-104, incorporated by reference herein.

Nonlimiting Synthesis Example

A nonlimiting example of a suitable wet strength additive, particularly a temporary wet strength additive, for inclusion in a fibrous structure and/or sanitary tissue product of the present invention, having the following structure:

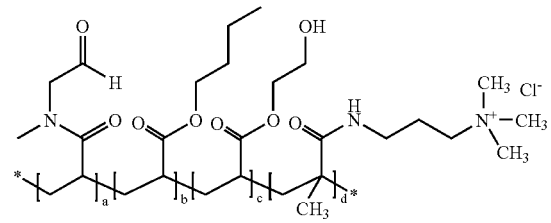

can be prepared as follows:

N-(2,2-dimethoxyethyl)-N-methyl acrylamide (45.71 g, 0.2369 mole), 2-hydroxyethyl acrylate (214.55 g, 1.8477 mole), [3-(methacryloylamino)propyl] trimethyl ammonium chloride (58.27 g, 0.2640 mole), n-butyl acrylate (33.83 g, 0.2682 mole) 2,2'-azobis(2-amidinopropane) dihydrochloride (2.147 g, 7.917 mmole), 2-propanol (152 ml), acetone (650 ml), and water (1.48 L) are added to a 5 L three-necked, round bottom flask fitted with a mechanical stirrer, temperature probe, and reflux condenser. This solution is sparged with Ar for 30 minutes and then heated from room temperature to 55° C., with constant stirring under Ar, at which point the reaction becomes exothermic. The reaction temperature is maintained between about 58° C. to about 60° C. until the reaction is no longer exothermic. The solution is heated at 60° C. for an additional 20 hours. This polymer will have an acetal protecting group. An analytical sample is reserved and characterized by proton NMR spectroscopy and gel permeation chromatography. The 2-propanol and acetone are removed in vacuo and then the viscous solution is transferred to a 12 L three necked, round bottom flask with water (2.9 L) and concentrated HCl (49 ml) is added. The solution is heated at 40° C. for four hours under nitrogen to hydrolyze the protecting group. After cooling to room temperature, the solution is adjusted to pH 5 with NaOH. The weight average molecular weight of this polymer will typically be about 92,000 and a, b, c, and d will typically be between about 9% to about 11%, between about 9% and about 11%, between about 69% to about 71%, and between about 9% to about 11%, respectively. The Tg for this polymer will typically be about 75° C.

Test Methods

A. % Decay Test Method a. Sample Preparation—Handsheets

If a sample fibrous structure is not in existence, then a sample handsheet can be prepared to test % Decay. Handsheets can be formed from 100% unrefined Northern Softwood Kraft (NSK), mixtures of NSK and Eucalyptus, or from other fibers as desired. After dispersing the NSK, or other fibers, in water, a temporary wet strength resin is added to the disintegrated pulp and the slurry is agitated for a fixed period of time ranging from 1 to 60 minutes. Handsheets are made essentially according to the TAPPI standard T205 with the following exceptions:

(1) the sheet is formed on a polyester wire and dewatered by suction rather than pressing;
(2) the embryonic web is transferred by vacuum to a polyester papermaking fabric;
(3) the sheet is then dried by steam on a rotary drum drier.

b. Testing 1. 11.33 cm (4.5 inch) wide by 10.16 cm (4 inch) long strips of fibrous structure or sanitary tissue product to be tested are prepared. 2.54 cm (1 inch) wide sample strips are cut from the fibrous structure or sanitary tissue product.

2. In a conditioned room where the temperature 23±3° C. (73±4° F.) and relative humidity 50±10% a sample strip [2.54 cm (1 inch) wide] is mounted onto an electronic tensile tester, an EJA Tensile Tester Model No. 1376–18 commercially available from Thwing Albert Instrument Company. The tensile tester is operated at a crosshead speed of 2.54 cm/minute (1 inch/minute). The tensile device is fastened in the lower clamp of the tensile tester such that the horizontal rod was parallel to the clamp faces and is otherwise symmetrically located with respect to the clamps. The position of the lower clamp is adjusted so that the horizontal axis of the rod was exactly 1" (2.54 cm) below the upper clamp.

3. A liquid container is filled to ⅛" (0.3175 cm) from the top of the container with standard tap water which contains 23 ppm calcium ion, 7 ppm magnesium ion and 67 ppm sodium bicarbonate. The sample strip being measured is threaded under the rod in the wet tensile device. The ends of the sample strip are placed together, the slack is removed and the upper clamp fastened. The sample strip is centrally located with respect to the horizontal rod and the upper clamp. The liquid container is raised immersing the looped end of the sample strip to a depth of at least ¾" (1.9 cm). Exactly 5 seconds after the liquid container is raised in place and with the liquid container remaining in place the tensile tester was engaged. The load is recorded. Wet tensile is expressed in g/in (g/2.54 cm) units.

$$\text{Average Wet Tensile(g/in)} = \frac{\text{sum of loads at peak for test runs}}{2 \times \text{number of tensile strips tested}}$$

Wet Tensile is calculated for machine direction (MD) and cross-machine directon (CD). Total Wet Tensile (TWT) =Avg. Wet Tensile (MD)+Avg. Wet Tensile (CD)

4. Next, a sample strip is clamped to the Intelect 500 as described above in Step 3. The liquid container is raised to its uppermost position immersing the looped end of the specimen to a depth of at least ¾" (1.9 cm) in the standard tap water. 5 minutes after the liquid container is raised in place the wet tensile load is again read.

$$\% \text{ Decay} = \frac{(TWT \text{ 5 sec soak} - TWT \text{ 5 min soak})}{TWT \text{ 5 sec soak}} \times 100$$

5. Step 4 is repeated except that the sample strip is immersed in the standard tap wate for 30 minutes rather than 5 minutes. The % Decay is calculated as follows:

$$\% \text{ Decay} = \frac{(TWT \text{ 5 sec soak} - TWT \text{ 30 min soak})}{TWT \text{ 5 sec soak}} \times 100$$

B. Total Dry Tensile Test Method 1. 11.33 cm (4.5 inch) wide by 10.16 cm (4 inch) long strips of fibrous structure or sanitary tissue product to be tested are prepared. 2.54 cm (1 inch) wide sample strips are cut from the fibrous structure or sanitary tissue product.

2. In a conditioned room where the temperature 23±3° C. (73±4° F.) and relative humidity 50±10% a 2.54 cm (1 inch) sample strip is placed on an electronic tensile tester, an EJA Tensile Tester Model No. 1376–18 commercially available from Thwing Albert Instrument Company. The tensile tester is operated according to the manufacturer's directions at a crosshead speed of 5.08 cm/minute (2 inch/minute) and a gauge length of 10.16 cm (4 inch/minute). Dry tensile is expressed in g/in (g/2.54 cm) units.

$$\text{Average Dry Tensile(g/in)} = \frac{\text{sum of loads at peak for test runs}}{\text{total number of tensile strips tested}}$$

The total dry tensile is the arithmetic total of MD and CD tensile of the sample strips.

C. Reduction in % Clogging Test Method

A control fibrous structure and/or sanitary tissue product comprising a wet strength additive having a basis weight of 34.18 g/m² (21 lbs/3000 ft²), an initial total wet tensile of at least 40 g/2.54 cm (40 g/in), preferably at from about 60 g/2.54 cm (60 g/in) to about 70 g/2.54 cm (70 g/in) is obtained.

Strips of 71.12 cm (28 inches) length by 10.43 cm (4.5 inches) width of the control fibrous structure and/or sanitary tissue product and of the fibrous structure and/or sanitary tissue product to be tested are obtained. Each strip is individually folded upon itself to form a folded sample of 10.16 cm (4 inches) length by 10.43 cm (4.5 inches) width.

In a conditioned room where the temperature is 23±3° C. (73±4° F.) and a relative humidity of 50±10%, six of the folded control fibrous structures and/or sanitary tissue products are placed one at a time with a 10 second interval into a Kohler Portrait Lite toilet with a 6 L (1.6 gallon) per flush volume. Each folded sample is weighed before being placed in the toilet. The toilet is connected to a 100 mm (4 inch) internal diameter drainpipe. The total length of the drainpipe is 13.25 m–14 m (43–45 ft). The drainpipe includes four bends constructed of two 45° elbows. The line pressure of the water supply is regulated to a 20±3 psi. A single 100 mm (4 inch) internal diameter "T" is inserted at the junction between the toilet and the drainpipe to provide venting.

After all six folded control samples have been placed in the toilet, the toilet is flushed.

The location of each control sample within the toilet and/or drainpipe is recorded.

If a sample failed to leave the toilet bowl or drainpipe, the trial is recorded as a clogging incident.

If the water level in the toilet bowl is normal after the flush, but the samples did not leave the toilet bowl/drainpipe, an extra flush is performed followed by plunging if necessary to remove the samples from the toilet/drainpipe. This is reported as a clogging incident.

If the water level in the toilet bowl is higher than normal after the flush and the samples did not leave the toilet bowl/drainpipe on their own, the drainpipe is considered clogged and the flush is recorded as a failure (a clogging incident). The tissue is then removed from the drainpipe with the use of a toilet plunger before proceeding with the next trial.

If the toilet bowl/drainpipe starts to clog and the water level increases in the toilet bowl but then clears on its own without any intervention. This is not recorded as a clogging incident.

Run the trial by repeating the above steps with a cleaned out toilet a total of ten times. Calculate the percent clogging based on the number of times out of ten a clogging incident (failure) occurred.

Repeat the above steps with regard to the fibrous structures and/or sanitary tissue products to be tested.

Calculate the reduction (i.e., times 1.5 times, 2 times, 2.5 times, 3 times, etc.) in % Clogging, if any, by dividing the % Clogging of the control by the % Clogging of the test sample.

D. Softness Test Method

"Softness" of a fibrous structure and/or sanitary tissue product according to the present invention is determined as follows. Ideally, prior to softness testing, the samples to be tested should be conditioned according to Tappi Method #T4020M-88. Here, samples are preconditioned for 24 hours at a relative humidity level of 10 to 35% and within a temperature range of 22° C. to 40° C. After this preconditioning step, samples should be conditioned for 24 hours at a relative humidity of 48% to 52% and within a temperature range of 22° C. to 24° C. Ideally, the softness panel testing should take place within the confines of a constant temperature and humidity room. If this is not feasible, all samples, including the controls, should experience identical environmental exposure conditions.

Softness testing is performed as a paired comparison in a form similar to that described in "Manual on Sensory Testing Methods", ASTM Special Technical Publication 434, published by the American Society For Testing and Materials 1968 and is incorporated herein by reference. Softness is evaluated by subjective testing using what is referred to as a Paired Difference Test. The method employs a standard external to the test material itself. For tactile perceived softness two samples are presented such that the subject cannot see the samples, and the subject is required to choose one of them on the basis of tactile softness. The result of the test is reported in what is referred to as Panel Score Unit (PSU). With respect to softness testing to obtain the softness data reported herein in PSU, a number of softness panel tests are performed. In each test ten practiced softness judges are asked to rate the relative softness of three sets of paired samples. The pairs of samples are judged one pair at a time by each judge: one sample of each pair being designated X and the other Y. Briefly, each X sample is graded against its paired Y sample as follows:

1. a grade of plus one is given if X is judged to may be a little softer than Y, and a grade of minus one is given if Y is judged to may be a little softer than X;

2. a grade of plus two is given if X is judged to surely be a little softer than Y, and a grade of minus two is given if Y is judged to surely be a little softer than X;

3. a grade of plus three is given to X if it is judged to be a lot softer than Y, and a grade of minus three is given if Y is judged to be a lot softer than X; and, lastly:

4. a grade of plus four is given to X if it is judged to be a whole lot softer than Y, and a grade of minus 4 is given if Y is judged to be a whole lot softer than X.

The grades are averaged and the resultant value is in units of PSU. The resulting data are considered the results of one panel test. If more than one sample pair is evaluated then all sample pairs are rank ordered according to their grades by paired statistical analysis. Then, the rank is shifted up or down in value as required to give a zero PSU value to which ever sample is chosen to be the zero-base standard. The other samples then have plus or minus values as determined by their relative grades with respect to the zero base standard. The number of panel tests performed and averaged is such that about 0.2 PSU represents a significant difference in subjectively perceived softness. The raw PSU score is then corrected for lint and dry tensile. For every +1 lint value over 7.0 (the reference lint value), the raw PSU score is reduced by 0.15 PSU. For every 100 g of total dry tensile value over 450 g/2.54 cm (450 g/in) (the reference total dry tensile value), the raw PSU score is reduced by 0.35 PSU.

The fibrous structures and/or sanitary tissue products of the present invention are compared to a fibrous structure and/or sanitary tissue product comprising a commercially available and/or known wet strength additive at the time of filing this application.

All documents cited in the Detailed Description of the Invention are, in relevant part, incorporated herein by reference; the citation of any document is not to be considered as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fibrous structure that exhibits a Reduction in % Clogging of greater than about 1.5 times as determined by the Reduction in % Clogging Test Method described herein wherein the fibrous structure comprises a temporary wet strength additive comprising a polymer backbone comprising a co-crosslinking monomeric unit comprising an electrophilic moiety, a homo-crosslinking monomeric unit comprising a hydroxyl moiety and lacking electrophilic moieties and nucleophilic moieties that form stable, covalent bonds with electrophilic moieties, and a cationic monomeric unit wherein the temporary wet strength additive has the following formula:

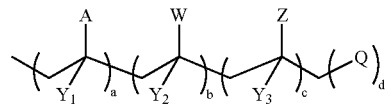

wherein: A is:

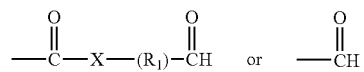

Z is:

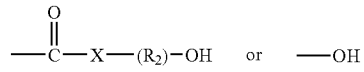

and X is —O—, —NH—, or —NCH$_3$—, and R$_1$ is a substituted or unsubstituted aliphatic group. R$_2$ is an unsubstituted aliphatic group or a substituted aliphatic group lacking electrophilic moieties and nucleophilic moieties that form stable, covalent bonds with electrophilic moieties; Y$_1$, Y$_2$, and Y$_3$ are independently —H, —CH$_3$, or a halogen; W is a non-nucleophilic, water-soluble nitrogen heterocyclic moiety or a tertiary amide, and Q is a cationic monomeric unit, wherein the mole percent of a is from about 1% to about 47%, the mole percent of b is from about 0% to about 70%, the mole percent of c is from about 10% to about 90%, and the mole percent of d is from about 1% to about 40%; and said temporary wet strength additive has a weight average molecular weight of at least about 70,000.

2. The fibrous structure according to claim 1 wherein the wet strength additive is present in the fibrous structure at a level of from about 0.005% to about 5% by weight of fibers.

3. A sanitary tissue product comprising a fibrous structure according to claim 1.

4. The sanitary tissue product according to claim 3 wherein the sanitary tissue product exhibits a softness improvement of greater than +0.20 psu.

5. The fibrous structure according to claim 1 wherein the fibrous structure exhibits an initial total wet tensile of at least about 30 g/2.54 cm.

6. The fibrous structure according to claim 1 wherein the fibrous structure exhibits a % Decay at 5 minutes of greater than 45% as determined by the % Decay Test Method described herein.

7. The fibrous structure according to claim 1 wherein the fibrous structure exhibits a % Decay at 30 minutes of greater than 65% as determined by the % Decay Test Method described herein.

8. The fibrous structure according to claim 1 wherein within the temporary wet strength additive a is from about 5% to about 30%, b is from about 0% to about 60%, c is from about 30% to about 80%, and d is from about 2% to about 20%.

9. The fibrous structure according to claim 1 wherein within the temporary wet strength additive $R_1$ comprises a $C_2$–$C_7$ aliphatic chain.

10. The fibrous structure according to claim 1 wherein within the temporary wet strength additive Z is

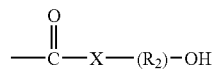

and $R_2$ is a $C_2$–$C_4$ aliphatic chain.

11. The Fibrous structure according to claim 1 wherein within the temporary wet strength additive the monomeric unit comprising Z is selected from the group consisting of 2-hydroxyethyl acrylate, 2-hydroxyethyl methacrylate, 4-hydroxybutyl acrylate, 4-hydroxybutyl methacrylate, glyceryl mono-methacrylate, glyceryl mono-acrylate, 2-hydroxypropyl acrylate 2-hydroxypropyl methacrylate, diethylene glycol mono-methacrylate, N-2-hydroxyethyl methacrylamide, N-(2-hydroxypropyl) methacrylamide, and acrylamidotrishydroxymethylmethane.

12. The fibrous structure according to claim 1 wherein within the temporary wet strength additive the monomeric unit comprising W is selected from the group consisting of vinyl pyrrolidones, vinyl oxazolidones, vinyl imidazoles, vinyl imidazolines, alkyl acrylates, and alkyl methacrylates.

13. The fibrous structure according to claim 1 wherein within the temporary wet strength additive the monomeric unit comprising W is a vinyl pyrrolidinone, the monomeric unit comprising Z is 2-hydroxyethyl acrylate, and the monomeric unit comprising A is selected from N-(2,2-dimethoxyethyl)-N-methyl acrylamide, 3,3-dimethyoxypropyl acrylamide, 3,3 diethoxypropyl acrylamide, 3,3-dimethoxypropyl methacrylamide, 2,2 dimethoxy-1-methylethyl acrylate, 3,3-dimethoxypropyl methacrylate, 2-(acryloylamino)ethanal dimethylacetal, 2-(methacryloylamino)propanal dimethyl acetal, 5-(acryloylamino)pentanal dimethylacetal, 8-(acryloylamino)octanal dimethylacetal, and 3-(N-acryloyl-N-methylamino)propanal dimethyl acetal.

* * * * *

UNITED STATES PATENT AND TRADEMARK OFFICE
CERTIFICATE OF CORRECTION

PATENT NO. : 7,217,339 B2  Page 1 of 1
APPLICATION NO. : 10/958029
DATED : May 15, 2007
INVENTOR(S) : Khosrow Parviz Mohammadi It is certified that error appears in the above-identified patent and that said Letters Patent is hereby corrected as shown below:

In Col. 7, line 62, the symbol "–H$_3$" should be –CH$_3$.

In Col. 8, line 66, "(methacryloylaminopropanal" should be (methacryloylamino)propanal.

Signed and Sealed this

Eighth Day of July, 2008

JON W. DUDAS
*Director of the United States Patent and Trademark Office*